A. ZOLLER.
OPERATING MECHANISM FOR POWER DRIVEN VEHICLES.
APPLICATION FILED APR. 29, 1921.

1,395,993.

Patented Nov. 1, 1921.

INVENTOR:
Arnold Zoller

UNITED STATES PATENT OFFICE.

ARNOLD ZOLLER, OF BERLIN, GERMANY, ASSIGNOR TO ARGUS-MOTOREN-GESELL-SCHAFT M. B. H., OF BERLIN-REINICKENDORF-OST, GERMANY.

OPERATING MECHANISM FOR POWER-DRIVEN VEHICLES.

1,395,993.  Specification of Letters Patent.  Patented Nov. 1, 1921.

Application filed April 29, 1921. Serial No. 465,505.

*To all whom it may concern:*

Be it known that I, ARNOLD ZOLLER, a citizen of the Swiss Republic, residing at Berlin, Germany, have invented certain new and useful Improvements in Operating Mechanism for Power-Driven Vehicles, (for which I have filed applications for patent in Germany October 20, 1919, and Italy January 14, 1920), of which the following is a specification.

My invention refers to power driven vehicles and more especially to the mechanism for operating the speed gear, clutch and brakes connected with such vehicles.

For operating the speed gear and for adjusting the brakes to be operated by hand and foot as well as for throwing in and out of the motor clutch in power driven vehicles a large number of parts are required, which in operation are not easily accessible, which weigh altogether a considerable amount and in consequence of their being necessarily manufactured and worked separately cost a considerable amount to produce.

According to the present invention the object aimed at is to reduce the number and weight of these parts and therefore their cost of manufacture, and so to arrive at a simplified construction of power vehicle, while at the same time affording the advantage of easy inspection and accessibility of all the parts together with a higher degree of certainty in operation.

This aim is attained according to the present invention by mounting two pairs of shafts symmetrically to each other upon a casing which is connected with the speed gear casing. Each of these pairs of shafts consists in known manner of a solid shaft and a hollow shaft; one pair serves to operate the changing of gear and part of the brakes, for example, the hand brakes while the other pair moves the engine clutch in and out and operates the other braking devices, for example the foot brakes.

According to one particular form of construction of the invention the casing upon which the two pairs of shafts are mounted serves to receive the ball joint surrounding the universal joint of the shaft, which ball joint is arranged at the front end of the arm of the rear axle bridge extending in the longitudinal axis of the vehicle. The object of this arrangement is to secure that the joints or the like, by means of which the draw members leading to the braking devices for example rear wheel brakes engage with the braking levers situated on the pairs of shafts are mounted in the plane of oscillation of the universal ball joint. By this means the transference of shocks to the braking levers when the rear wheels move up and down is avoided, which shocks as is known can be very troublesome to the driver. Moreover the advantage is hereby obtained that the play of the brake bands, which is intended to prevent the undesired application of the brakes upon the up and down swinging of the rear wheels in consequence of alteration in length in the rods, can be made relatively small as compared with present arrangements. This makes possible a more rapid braking operation in consequence of a reduction of the necessary movement of the hand or foot lever.

The subject of the invention is illustrated in one construction in the accompanying drawing.

Figure 1:
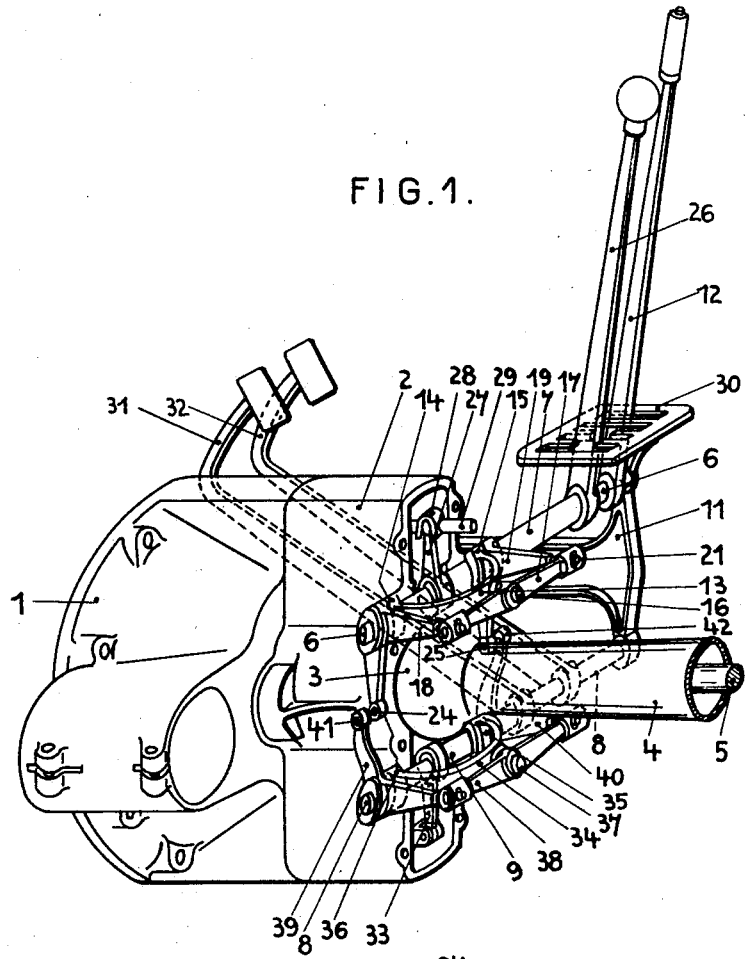
Figure 1 is a perspective view of the whole arrangement.
Figure 2:
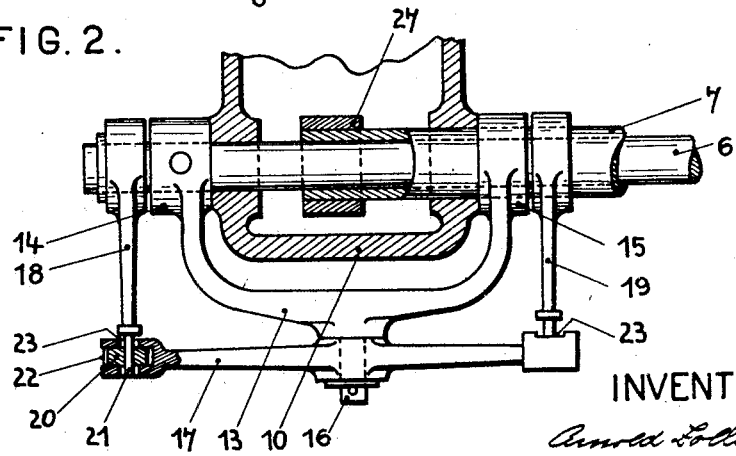
Fig. 2 is a plan view partly in section of a detail.

The casing 1 for the reception of the speed gear can be attached directly to the casing of the engine, of the fly wheel or of the clutch. With the casing 1 is connected a casing 2 which serves in the arrangement illustrated for mounting the ball joint 3, which in known manner is arranged at the front end of the arm 4 of the rear axle bridge running in the longitudinal axis of the vehicle and embraces the universal joint of the shaft 5 leading to the differential gear. The casing 2 further serves for mounting and partly inclosing the two pairs of shafts 6, 7 and 8, 9 which are arranged symmetrically to the ball joint 3 above and below the latter. The casing 2 is formed in two parts; in Fig. 1 only the main part is illustrated, the cover 10 which is only shown in Fig. 2 being omitted. The bearing points for the ball joint 3 and the two pairs of shafts 6, 7 and 8, 9 are cut out in the dividing plane of the casing 2 and its cover 10.

The pair of shafts 6, 7 which lie above the ball joint 3 serve for actuating the speed gear contained within the casing 1 and the brakes which are to be operated by hand. The inner transverse shaft then is mounted near its one end in the casing 2 and at its other end in a bracket 11 which may be attached to the engine casing or to the gear casing 1 or to the chassis of the vehicle. Upon this inner solid shaft 6 is keyed the hand lever 12 and also one eye 14 of a curved yoke piece 13, the other eye 15 of which sits loosely on the hollow shaft 7 surrounding the inner shaft 6. The yoke shaped lever 13 embraces the casing cover 10 and carries at its back a pin 16 upon which is mounted so as to turn the compensating lever 17. This engages at both its ends, by means of cross joints with the horizontal arms of two angle levers 18, 19. Each of the cross joints consists of a cylindrical stone 20 adapted to slide in a boring of the double lever 17, which stone is bored through at right angles to the axis of the compensating lever 17. Through this boring engages the pin 21 of the horizontal arm of the double lever 18 or 19. When the compensating lever 17 swings outward the stone 20 is displaced in its boring 22 at the end of the compensating lever 17, while the pin 21 finds the necessary play in a longitudinal slot 23. The angle lever 18 is mounted loosely so as to turn, but is held against lateral displacement upon the solid shaft 6 and the double lever 19 can turn freely on the hollow shaft 7 but is secured against lateral displacement. At the lower ends of the vertical arms of the angle levers 18 and 19 engage the draw elements which lead to the braking devices. The points of the attachment 24, 25 of the draw elements to the angle levers 18, 19 lie in the horizontal central plane of the ball joint 3, that is to say in the axis of rotation of the vertical oscillations which the rear axle of the vehicle makes about the center point of the ball. Owing to the fact that the angle levers 18, 19 are by means of the compensating lever 17 moved with the yoke shaped lever 13 account is taken, when one or the other side of the rear wheel axle moves up or down with the braking devices connected thereto, of the different angular displacement of the double levers 18, 19 hereby caused.

The hollow shaft 7 which is mounted to rotate upon the inner shaft 6 carries at one end a hand lever 26 and at the other end a gear change lever 27 which engages with the U-shaped yoke piece 28 of a change rod 29 extending into the casing 1. Further controlling members with U-shaped yoke pieces not shown lie in front of and behind the striker rod 29, so that when the hollow shaft 7 is displaced the lever 27 can engage in each of the yoke pieces of the three striker rods one after the other, provided that the lever 27 is for the time being in the middle position. In this manner the three striker rods can be actuated by a single lever 27. By means of the three striker rods six different positions can be obtained in known manner by forward and backward movement, that is to say, for four forward speeds, for one reverse and one free run. If for example in small vehicles only four positions are desired one of the three striker rods could be omitted. The hand lever 26 engages in known manner in a suitably formed slot guide in a gate 30, in one slot of which the hand lever 12 in also guided.

The lower pair of shafts 8, 9 is formed in a similar manner to the upper pair 6, 7. The shafts 8 and 9 however are not actuated by hand levers but by foot levers 31, 32; the former is mounted on one end of the hollow shaft 9 while the latter is keyed upon the solid shaft 8. Upon the hollow shaft 9 is further secured a downwardly directed lever arm 33 which engages by a joint with the rod for throwing the engine clutch in and out. Moreover, as in the upper pair of shafts, a yoke shaped lever 34 is provided, the eye 35 of which mounted on the hollow shaft 9 can freely turn while the other eye 36 is secured upon the solid shaft 8 by means of a pin, key or the like. The yoke shaped lever 34 is therefore coupled with the solid shaft 8. It carries in turn a pin 37 upon which a compensating lever 38 rocks, the ends of which are formed as cross joints as in the case of the compensating lever 17. In the cross joints engage also angle levers 39, 40, the first of which 39 rides loosely on the end if the solid shaft 8 while the other 40 rides loosely on the hollow shaft 9. The ends 41, 42 of the upwardly extending arms of the angle levers 39, 40 again lie in the horizontal axis of rotation of the rear axle bridge, as do the ends 24, 25 of the downwardly directed arms of the angle levers 18, 19. To these free ends of the angle levers 39, 40 are again attached tension elements leading to the brake devices.

By the angle levers 18, 19, 39 and 40 therefore four braking devices are operated, two by the hand lever 12 and two by the foot lever 32. It is immaterial of what nature these braking devices are. The arrangement can for example be such that the angle levers 18 and 39 operate upon one rear wheel brake and the angle levers 19 and 40 upon the second rear wheel brake so that one of the angle levers operating upon one brake draws on brake blocks lying within the brake disk while the other angle lever actuates brake blocks lying outside the brake disk. The arrangement can however for example be such that the upper or lower pair of angle levers act on the braking device of the differential gear.

The construction described above shows the best solution of the problem underlying the present invention. Another way of carrying out the invention is for example to arrange that the levers operated by the feet should engage with the upper pair of shafts and that the hand levers should engage with the lower pair of shafts and that accordingly the transmission members of the speed gear, clutch and the braking devices should be formed to correspond.

I claim:

1. In mechanism of the kind described in combination, a speed gear casing, an operating gear casing connected with said speed gear casing and two pairs of shafts, each pair composed of a solid shaft and a hollow shaft surrounding said solid one, mounted symmetrically on said operating gear casing, said pairs of shafts serving for operating the speed gear, clutch and brakes, respectively, of said vehicle.

2. In mechanism of the kind described in combination, a speed gear casing, an operating gear casing connected with said speed gear casing, a universal joint and two pairs of shafts, each pair composed of a solid shaft and a hollow shaft surrounding said solid one, mounted symmetrically on said operating gear casing, said pairs of shafts serving for operating the speed gear, clutch and brakes, respectively, of said vehicle.

3. In mechanism of the kind described in combination, a speed gear casing, an operating gear casing connected with said speed gear casing, two pairs of shafts, each pair composed of a solid shaft and a hollow shaft surrounding said solid one, mounted symmetrically on said operating gear casing, a yoke shaped lever fixed on each solid shaft, a compensating lever pivoted to each yoke shaped lever and an angle lever loosely mounted on each shaft said angle levers serving for actuating the braking devices of said vehicle.

4. In mechanism of the kind described in combination, a speed gear casing, an operating gear casing connected with said speed gear casing, two pairs of shafts, each pair composed of a solid shaft and a hollow shaft surrounding said solid one, mounted symmetrically on said operating gear casing a yoke shaped lever fixed on each solid shaft, a compensating lever pivoted to each yoke shaped lever and an angle lever, loosely mounted on each shaft and serving for actuating the braking devices of said vehicle, the free ends of the vertical arms of said angle levers being disposed at a level with each other and in the horizontal axis of rotation of the rear axle bridge.

In testimony whereof I affix my signature.

ARNOLD ZOLLER.